(12) United States Patent
Heikamp

(10) Patent No.: US 8,025,708 B2
(45) Date of Patent: Sep. 27, 2011

(54) LIQUID SEPARATOR, PARTICULARLY OIL SEPARATOR FOR COMPRESSED AIR SYSTEMS

(75) Inventor: Wolfgang Heikamp, Waldsee (DE)

(73) Assignee: Mann + Hummel GmbH, Ludwigsburg (DE)

( * ) Notice: Subject to any disclaimer, the term of this patent is extended or adjusted under 35 U.S.C. 154(b) by 295 days.

(21) Appl. No.: 12/517,079

(22) PCT Filed: Dec. 6, 2007

(86) PCT No.: PCT/EP2007/063442
§ 371 (c)(1),
(2), (4) Date: Jun. 1, 2009

(87) PCT Pub. No.: WO2008/071621
PCT Pub. Date: Jun. 19, 2008

(65) Prior Publication Data
US 2010/0000412 A1    Jan. 7, 2010

(30) Foreign Application Priority Data
Dec. 14, 2006  (DE) .................. 20 2006 019 003 U

(51) Int. Cl.
*B01D 39/00* (2006.01)

(52) U.S. Cl. ............... 55/498; 55/486; 55/487; 55/524; 55/527; 55/528; 55/501; 55/502; 55/503; 55/510; 55/493; 55/495; 55/385.3; 55/423; 55/426; 55/428; 55/424; 55/DIG. 17; 96/198; 123/198 E; 210/232; 210/234

(58) Field of Classification Search ............... 96/198; 123/198 E; 210/234, 232; 55/498, 486, 487, 55/524, 527, 528, 501, 502, 503, 510, 493, 55/495, 385.3, 423, 426, 428, 424, DIG. 17
See application file for complete search history.

(56) References Cited

U.S. PATENT DOCUMENTS

| | | | | | |
|---|---|---|---|---|---|
| 2,544,244 | A | * | 3/1951 | Vokes ........................ | 210/234 |
| 2,955,712 | A | * | 10/1960 | Gutkowski ................. | 210/234 |
| 2,991,885 | A | * | 7/1961 | Gutkowski ................. | 210/133 |
| 5,605,748 | A | * | 2/1997 | Kennedy et al. ............ | 55/486 |
| 5,607,582 | A | * | 3/1997 | Yamazaki et al. .......... | 210/234 |
| 5,826,854 | A | | 10/1998 | Janvrin et al. | |

(Continued)

FOREIGN PATENT DOCUMENTS

DE    10052524    4/2002

(Continued)

OTHER PUBLICATIONS

German search report for DE 20 2006 019 003.1; WIPO search report for PCT/EP2007/063442.

*Primary Examiner* — Jason M Greene
*Assistant Examiner* — Dung Bui
(74) *Attorney, Agent, or Firm* — James Hasselbeck

(57) ABSTRACT

The invention relates to a liquid separator, particularly an oil separator for compressed air systems. The liquid separator comprises a housing (15), which can be detachably connected by means of a bayonet-type connector (11) to a counterpart (12).

4 Claims, 1 Drawing Sheet

U.S. PATENT DOCUMENTS

| | | |
|---|---|---|
| 6,409,786 B1 | 6/2002 | Wright et al. |
| 6,936,084 B2 | 8/2005 | Schlensker et al. |
| 6,962,615 B2 * | 11/2005 | Staudenmayer et al. ....... 55/486 |
| 7,195,122 B2 * | 3/2007 | Hiranaga et al. .............. 210/436 |
| 7,264,718 B2 * | 9/2007 | Knoll et al. ................... 210/232 |
| 7,837,876 B2 * | 11/2010 | Ye et al. ........................ 210/234 |

FOREIGN PATENT DOCUMENTS

| | | |
|---|---|---|
| DE | 10309428 | 9/2004 |
| DE | 69824631 | 6/2005 |
| EP | 1128060 | 8/2001 |
| FR | 235613 | 2/1978 |

* cited by examiner

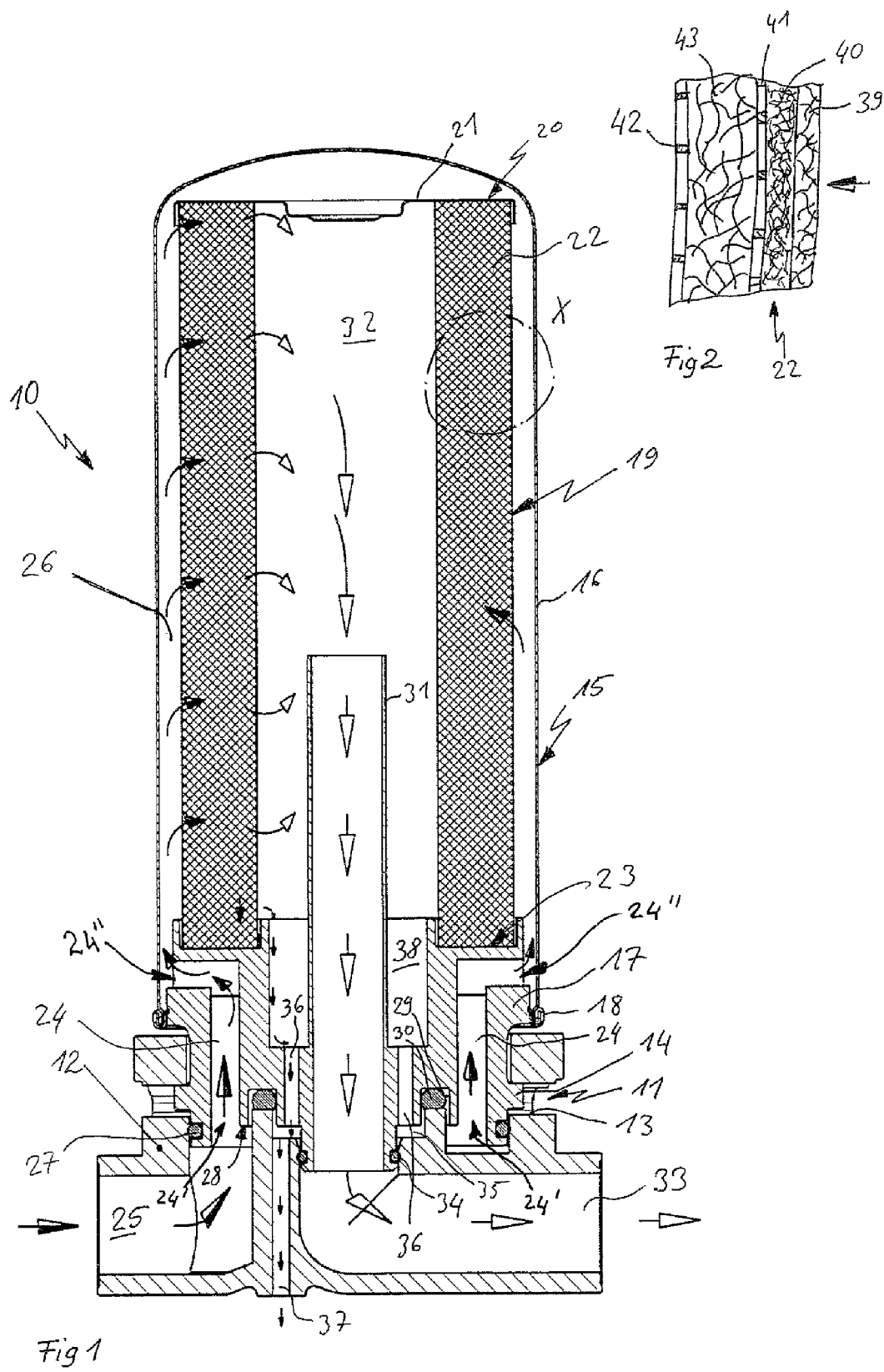

LIQUID SEPARATOR, PARTICULARLY OIL SEPARATOR FOR COMPRESSED AIR SYSTEMS

CROSS REFERENCE TO RELATED APPLICATIONS

This application is US National Stage Entry of international patent application no. PCT/EP2007/063442, filed Dec. 6, 2007 designating the United States of America, the entire disclosure of which is incorporated herein by reference. Priority is claimed based on Federal Republic of Germany patent application no. 20 2006 019 003.1, filed Dec. 14, 2006, the entire disclosure of which is incorporated herein by reference.

TECHNICAL FIELD

The invention concerns a liquid separator.

PRIOR ART

Liquid separators are known which separate oil droplets from an air flow. For this purpose, the liquid separator has a separating medium that is arranged in a housing. The housing comprises a housing cup and a housing lid. The housing lid has a thread with which the liquid separator is screwed onto a head. In the head there is an air conduit for the air-oil mixture and a purified air conduit for the purified air. Moreover, the head has an oil discharge. The lid is provided with an unfiltered air inlet as well as a purified air outlet. The unfiltered air inlet communicates with the air-oil mixture conduit. The purified air outlet of the liquid separator is connected to the purified air passage of the head. The oil droplets contained in the air flow to be purified are agglomerated by the separator medium to larger drops that flow downward on the inner side of the circular closed separating medium. The separated oil can exit the liquid separator through an oil drain and is discharged by the oil discharge of the head. The liquid separator has a seal that is arranged between the lid of the liquid separator and the head. When mounting the liquid separator on the head, the housing is screwed onto the head in such a way that a seal-tight connection is produced. Depending on the force applied for screwing the liquid separator onto the head, the seal is compressed more or less. When the pressing force is too small leakage may occur. When the screw-on torque of the filter housing is too great, the seal may become damaged or the required release torque is too high so that an element exchange is made difficult. Moreover, the liquid separator must be rotated several times about its own axis until a fixed connection is generated.

It is an object of the present invention to provide a liquid separator that can be mounted in a simple way and is reliable with regard to handling.

SUMMARY OF THE INVENTION

The liquid separator according to the invention comprises a separating element and a housing. The housing comprises an inlet for the gas to be purified and an outlet for the purified gas. Moreover, the housing comprises a drain for the separated liquid. The separating element is integrated into the housing in such a way that the inlet is seal-tightly separated from the outlet. In this connection, the separating element has a separating medium that removes the liquid droplets contained in the gas flow from the gas flow. By means of the liquid separator any type of gas can be purified by removing liquid droplets contained therein. Preferably, air, in particular that of compressed air devices, can be purified. In this connection, contained water or oil droplets can be removed from the air flow.

The housing is connectable by a bayonet connection to the counterpart. The counterpart can be, for example, a connecting head which is connected to the compressed air devices. The bayonet connection is effected by a relative rotational movement of the liquid separator relative to the counterpart. For this purpose, on the liquid separator and on the counterpart several contours are arranged that will engage one another and have an incline relative to the filter axis. The incline extends about a defined circumferential angle and passes into an area that is parallel to the sealing area. Moreover, the matching contours can be designed such that within the rotational movement they can generate a locking action and can produce a stop for limiting the rotational movement. The locking action can be realized, for example, by a zigzag course of the matching contours. Alternatively, the locking action can also be produced by movable action elements which engage in a defined position a contour of the counterpart or of the liquid separator. Between the liquid separator and the counterpart preferably an elastomer seal is arranged that by means of the bayonet connection is clamped between two matching sealing surfaces. In this connection, the elastomer seal can be arranged axially as well as radially. In case of axial arrangement of the elastomer seal, it can produce the required tension for the locking connection.

The means for producing the bayonet connection can be arranged in a special embodiment fixedly on the housing. As materials for the housing as well as for the means for forming the bayonet connection metals as well as plastic materials are suitable.

The liquid separator according to the invention can be connected without any auxiliary means with the counterpart wherein a defined clamping action is produced. The liquid separator is placed by the technician onto the counterpart and is screwed on by rotation about a defined rotational angle. The rotational angle is limited by a stop and/or a locking action of the bayonet connection. The rotary angle can be, for example, between 45 degrees and 360 degrees. Preferably, the rotational angle is between 60 degrees and 180 degrees. As a result of the predetermined incline of the bayonet contour the clamping action of the seal between the liquid filter and the flange housing is defined and ensured independent of the screw-on torque. This enables a simple and reliable mounting and removal of the liquid separator.

In case of a radial arrangement of the elastomer seal, seizing thereof on the surface is prevented and in this way an easy release of the liquid filter is ensured when demounting it.

According to an advantageous embodiment of the invention the bayonet connection is formed between the lid and the counterpart. In this connection, the required geometries are integrally formed on the lid. The geometries on the lid can be generated, for example, by stamping or shaping. The housing cup can be formed in this connection as an inexpensive deep-drawn part that can be produced in a simple way.

In additional configurations the lid can be provided with an inlet for the gas to be purified and/or the outlet for the purified gas and/or a drain for the separated liquid.

In case of integration of the openings into the lid the cup can be designed as a component that can be produced simply. The functional geometries required for the housing such as inlets and outlets or steps and projections are integrated into the lid so that only the lid must be matched to the respective attachment situation.

According to a special embodiment of the liquid separator according to the invention the drain for the separated liquid is arranged in an area of the lid that with regard to the direction of action of gravity is arranged at a bottom area. In this connection, the lid is connected to the cup in such a way that the lid in the mounted state is arranged at the bottom area In this way, the separated liquid can simply drain out of the liquid separator. In this connection it is advantageous when the drain for the separated liquid communicates with a discharge in the counterpart.

In a special embodiment the separating element is seal-tightly connected to the lid so that leakage is prevented and the use of additional seals is not required. In this connection, the separating element can be glued or fused to the lid.

According to an advantageous embodiment, the separating element has a support body, a separating medium, and a drainage non-woven. In this connection, the support body is permeable for the gas to be purified. The separating medium and the drainage non-woven are arranged fixedly on the support body in such a way that undesirable deformations are prevented. Preferably, the separating medium and the drainage non-woven are formed as an areal knit fabric and wound about the support body in one for several layers. The liquid droplets contained in the gas flow are retained by the separating medium and agglomerated to form larger drops. The drainage non-woven that in the flow direction is arranged downstream of the separating medium serves for draining the liquid drops in the direction toward the drain. In this way, the separated drops can be removed simply and reliably from the gas flow and can be guided to the drain.

BRIEF DESCRIPTION OF THE DRAWINGS

Further details of the invention will be explained in the following with the aid of the drawing figures. It is shown in:
FIG. 1 a liquid separator in section view and
FIG. 2 a detail or the separating element in a section view.

EMBODIMENT(S) OF THE INVENTION

In FIG. 1, a liquid separator 10 is illustrated in section. The liquid separator 10 is attached by means of bayonet connection 11 in an upright position to a head 12. In an alternative embodiment the liquid separator 10 can also be attached in a suspended position on the head 12 by means of the bayonet connection 11. The head 12 has receiving geometries 13 that are engaged by contours 14 of the liquid separator 10 for securing the liquid separator 10 on the head 12. In this connection, the contours 14 can be designed as cams. The geometries of the cams as well as their number and arrangement on the liquid separator 10 is adaptable to specific customer requirements inasmuch as the head 12 is designed appropriately. The liquid separator 10 comprises a housing 15 that is formed by a cup 16 and a lid 17. The cup 16 is connected by means of a crimped connection 18 to the lid 17. In this connection, between the lid 17 and the head 16 a seal can be arranged. This seal can be embodied as an insertion part. In another embodiment, the seal can also be foamed onto the lid 12 or can be dosed on. As an alternative to the crimped connection 18 the lid 17 of course can also be attached by other methods to the cup 16. For example, the connection can be generated by folding an edge or by welding. The contours 14 are arranged on the lid 17. In other embodiments, the contours 14 can also be provided on the lid 16 or on an additional component. Within the housing 15 a separating element 19 is arranged. The separating element 19 is substantially embodied as a hollow cylindrical component. In other embodiment, other geometric shapes, for example, oval or truncated cone-shaped geometries, can be realized also, of course. The separating element 19 is provided at an upper end face 20 with a terminal disk 21 that closes off the upper end face 20 seal-tightly. For this purpose, the terminal disk 21 is glued to a cylindrically closed separating medium 22. The separating medium 22 is glued with a lower end face 23 directly to the lid 17. In this way, the lower end face 23 does not require an additional terminal disk. In other embodiments, the connection of the separating medium 22 with the terminal disk 21 or the lid 17 can also be generated in a different way, in particular by welding. The separating medium 22 is formed by a single-layer or multi-layer fiber glass coil. In this connection, the fiber glass coil can be provided with an impregnation, in particular, with phenolic resin. A further configuration of the separating medium 22 will be explained in the following in more detail with the aid of FIG. 2.

The lid 17 has inlet openings 24 that connect a mixture passage 25 of the head 12 to a crude chamber 26. The openings 24 are distributed at the end face of the lid 17 on a pitch circle wherein the inlet cross-sections 24' at the end face pass into outlet cross-sections 24" distributed on the periphery. For sealing the mixture passage 25 relative to the surroundings, the lid 17 comprises an O-ring seal 27 that matches an inner diameter of the head 12. In order to achieve a uniform flow into all inlet openings 24, the lid 17 has an axially displaced annular end face 28. In the area of the annular end face 28 a receiving groove 29 is arranged in which an O-ring 30 is seal-tightly compressed between the lid 17 and the head 12. The lid 17 has a centrally arranged clean pipe 31 that connects the clean chamber 32 arranged in the interior of the separating element 19 to the purified gas outlet 33. For a seal-tight connection of the clean pipe 31 to the purified gas outlet 33 an O-ring 34 is provided that is compressed between the head 12 and the lid 17. The end face of the clean pipe 31 in the axial direction projects past the annular end face 28 so that between the O-rings 30, 34 a liquid chamber 35 is formed. The liquid chamber 35 is connected by means of an outlet opening 36 to the interior of the separate element 19. For uniform discharge of the separated liquid several outlet openings 36 are uniformly distributed on a pitch circle. Since the outlet openings 36 are integrated directly into the lid 17, additional seals are not required because no sealing locations that must be sealed are present. The outlet openings 36 communicate by means of the liquid chamber 35 with the drain 37 arranged in the head 12. In order to be able to remove easily the liquid droplets that have been separated by means of the separating element 19 from the housing 15, the lid 17 has an annular receiving chamber 38 into which the outlet openings 36 open. The clean pipe 31 penetrates the receiving chamber 38 wherein the opening of the clean pipe is spaced axially relative to the receiving chamber 38. By means of this axial spacing it is achieved that no separated liquid droplets reach the clean pipe.

The liquid-gas mixture to be cleaned, in particular an air-oil mixture, flows through the mixture passage 25 into the inlet openings 24 of the liquid separator 10. The mixture to be cleaned flows from the crude chamber 26 through the separating element 19 wherein the separating medium 22 retains the contained liquid droplets. The purified gas enters the clean chamber 32 and passes in the flow direction through the clean pipe 31 to the purified gas outlet 33 wherein it leaves the head 12. In the illustrated embodiment, the flow passes through the separating element 19 from the exterior to the interior. In other embodiments, the separating element 19 can also be flown through from the interior to the exterior. In this case, the inlet and outlet 24, 31 as well as the crude and clean chambers 26, 32 are interchanged. The separated liquid droplets are guided into the bottom area of the separating medium from where they pass into the receiving chamber 38. The collected liquid droplets are guided through the outlet opening 36 into the drain 37. The liquid can subsequently be supplied again to another consumption process or can be disposed of.

In FIG. 2 the detail X of the separating medium 22 according to FIG. 1 is illustrated. The separating medium 22 has a coarse fiber glass coil 39 that is positioned in the flow direction on the exterior and a finer fiber glass coil 40 that is impregnated with phenolic resin. The fiber glass coils 39, 40 are mechanically stabilized by a support pipe 41. Between support pipe 41 and an inner pipe 42 a drainage non-woven 43 is arranged which is comprised of polyester, for example. In the drainage non-woven 43 the liquid droplets are collected and guided downwardly in the direction of the force of gravity. As an alternative to the described configuration several fiber glass coil layers or drainage non-woven layers can be arranged.

The invention claimed is:

1. Liquid separator for separating oil in compressed air systems, comprising: a separating element and a housing, wherein the housing comprises a lid and a cup, wherein the separating element is arranged seal-tightly in the housing and the housing is detachably connectable to a counterpart, wherein the housing is connectable by a bayonet connection to the counterpart, wherein the bayonet connection is formed between the lid and the counterpart, wherein the lid has an inlet for the gas to be purified, wherein the lid has an outlet for the purified gas, wherein the lid comprises an outlet for the separated liquid, wherein the outlet is arranged in a bottom area of the lid with respect to a direction of gravity, the outlet communicates with a drain that is arranged in the counterpart, wherein the separating element is seal-tightly connected to the lid, the lid is connected by a crimped connection to the cup, and characterized in that wherein the lid is connected by a crimped connection to the cup.

2. Liquid separator according to claim 1, wherein the separating element comprises a support body, a separating medium and a drainage non-woven, wherein the separating medium and the drainage non-woven are connected to the support body.

3. A liquid separator system for separating liquid from compressed air, comprising:
a head member defining a mixture passage, a purified gas outlet and a drain opening, said head member comprising:
a bayonet connection receptor having an inner diameter and receiving geometries;
a liquid separator comprising:
a cup member having a cup chamber and an open end;
a lid member sealably closing over said open end of said cup member, said lid member secured to said cup member by a crimped connection, said lid member defining passages including:
an inlet opening in communication with said mixture passage;
at least one outlet opening in communication with said drain opening; and
a clean pipe in communication with said purified gas outlet;
a separating element received into said cup chamber, said separating element adhesively secured at a first end to said lid, a second end of said separating element closed over by a terminal disk, said lid, terminal disk and separating element defining a clean chamber within;
said lid member further comprising:
a receiving chamber in the form of an annular depression for receiving liquid droplets separated from compressed air, wherein said receiving chamber is in communication with said outlet opening of said lid; and
a bayonet connection sized and configured to be received into said inner diameter of said bayonet connection receptor, said bayonet connection including
an O-ring seal configured to provide a sealed connection between said bayonet connector and said bayonet connection receptor; and
at least one contour sized and configured to releaseably engage with said receiving geometries of said bayonet connection, said contours and geometries operative to detachably mount said lid member onto said head member;
wherein said clean pipe extends through said receiving chamber and into said clean chamber, said clean pipe configured to isolate said liquid in said receiving chamber from said purified gas outlet; and
wherein head member and said lid member together define a liquid chamber therebetween, said liquid chamber interposed between said outlet opening of said lid and said drain opening of said head member, said liquid chamber guiding separated liquid droplets from said outlet openings of said lid member and said drain opening of said head member.

4. The liquid separator system of claim 3, wherein said separating element further comprises:
an inner pipe having a plurality of passages therethrough;
a support pipe having a plurality of passages therethrough and radially spaced inwards from said inner pipe;
a drainage non-woven disposed between said inner pipe and said support pipe; and
a fiberglass coil disposed at an interior of said support pipe and mechanically stabilized by said support pipe;
wherein said fiberglass coil is impregnated with a phenolic resin.

* * * * *